No. 743,846. PATENTED NOV. 10, 1903.
J. W. & G. H. EWART.
GAS AND WATER REGULATING VALVE FOR WATER HEATERS.
APPLICATION FILED OCT. 16, 1902.
NO MODEL. 2 SHEETS—SHEET 1.

No. 743,846. PATENTED NOV. 10, 1903.
J. W. & G. H. EWART.
GAS AND WATER REGULATING VALVE FOR WATER HEATERS.
APPLICATION FILED OCT. 16, 1902.
NO MODEL. 2 SHEETS—SHEET 2.
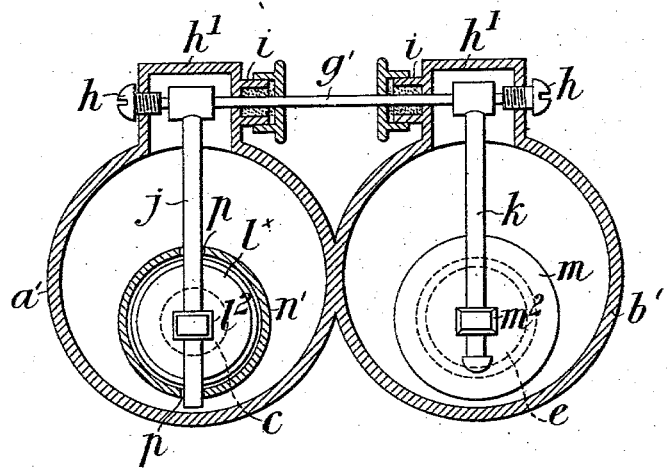
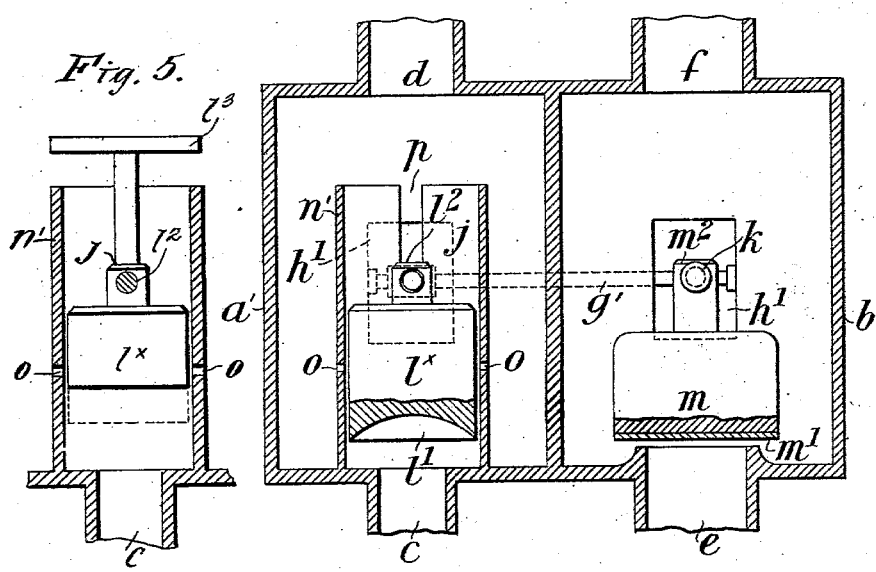
Witnesses
Inventors
J. W. Ewart
G. H. Ewart No. 743,846. Patented November 10, 1903.

UNITED STATES PATENT OFFICE.

JOHN WILLIAM EWART, OF WENDOVER, AND GEORGE HERBERT EWART, OF LONDON, ENGLAND.

GAS AND WATER REGULATING VALVE FOR WATER-HEATERS.

SPECIFICATION forming part of Letters Patent No. 743,846, dated November 10, 1903.

Application filed October 16, 1902. Serial No. 127,515. (No model.)

*To all whom it may concern:*

Be it known that we, JOHN WILLIAM EWART, residing at Surrey House, Chiltern road, Wendover, in the county of Bucks, and GEORGE HERBERT EWART, residing at 23 Lewisham road, Highgate road, London, England, subjects of the King of Great Britain, have invented new and useful Improvements in Gas and Water Regulating Valves for Water-Heaters, of which the following is a specification.

This invention relates to improvements in gas and water regulating valves for water-heaters.

According to the invention we construct our improved valve of two chambers or boxes of any suitable shape in cross-section, the said two boxes being secured together externally in any convenient manner—such, for example, as by being cast in one piece and being advantageously arranged side by side, although they may be arranged vertically one above the other, if preferred. Each of the chambers is provided with two tubes serving as inlet and outlet for the gas and water, respectively. Through the chambers there passes a spindle or axle, each chamber where it is pierced by the said spindle being provided with a stuffing-box for preventing leakage. The spindle carries an arm or arms inside each chamber, the free ends of the said arms having mounted upon them the gas and water valves. The water-valve comprises a disk or the like of metal arranged so as to cover the water-inlet. The gas-valve comprises a solid block of metal having fixed to its under side a sheet of rubber to enable it to make a good seat upon the inlet-tubes.

Figure 1:
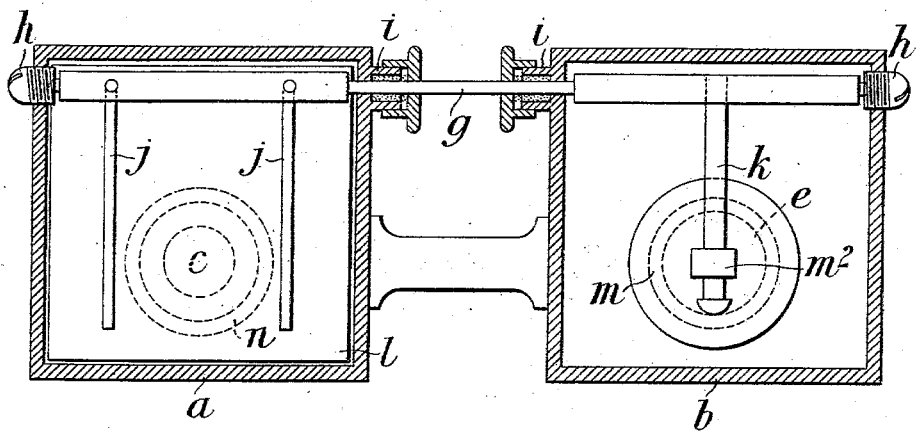
Figure 2:
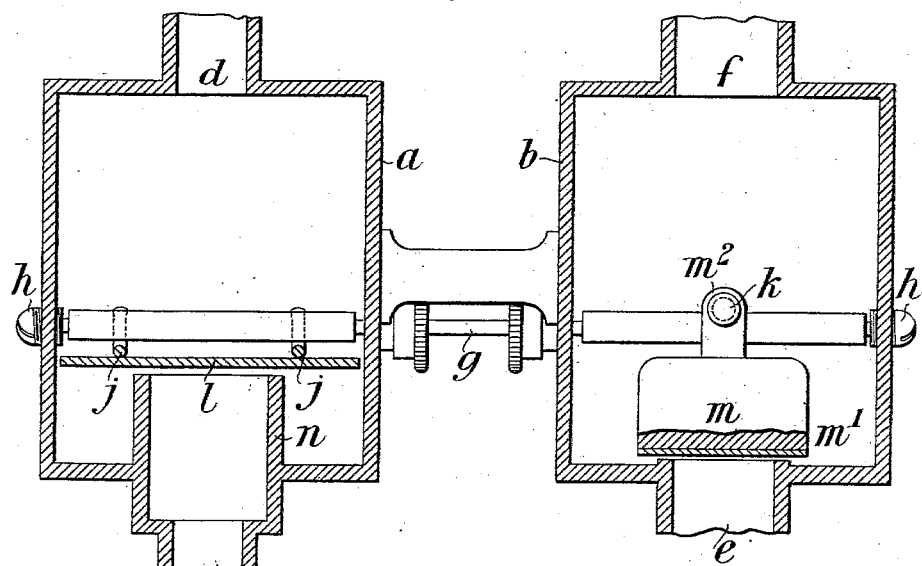

In the accompanying drawings, Figure 1 is a horizontal section of a gas and water regulating valve made according to the invention. Fig. 2 is a sectional elevation thereof. Figs. 3 and 4 are views, similar to Figs. 1 and 2, of a slightly-modified construction of valve; and Fig. 5 is a partial sectional view of a slight modification of the form of the water-controlling valve shown in Figs. 3 and 4.

Referring first to the arrangement shown in Figs. 1 and 2, $a$ is the water-chamber, and $b$ the gas-chamber, these two chambers being externally joined together. $c$ is the water-inlet pipe, and $d$ the water-outlet pipe, in connection with the chamber $a$, and $e$ is the gas-inlet, and $f$ the gas-outlet, pipe in connection with the chamber $b$. $g$ is the spindle or axle, the ends of which are supported by pivot-pins $h$ $h$, adjustably secured in the walls of the chambers $a$ and $b$, the said spindle piercing the adjacent walls of the said chambers, which are provided with stuffing-boxes $i$ $i$ to pack the spindle $g$ and prevent leakage from the chambers. $j$ $j$ are arms which are secured upon the spindle $g$ inside the chamber $a$ and which carry the disk $l$, forming the water-valve, adapted to close the water-inlet $c$, as clearly shown in Fig. 2. The gas-valve $m$ comprises a solid block fitted at its under side with the rubber packing $m'$, this valve being provided with an eye $m^2$, by means of which it is suspended upon the end of the arm $k$.

In the modified construction of valve shown in Figs. 3 and 4 the spindle $g'$ passes through expansions or enlargements $h'$ $h'$ of the chambers $a'$ and $b'$, and the valve $l^\times$ instead of being in the form of a disk is made in the shape of a solid block hollowed out at its under side, as shown at $l'$, and is suspended by the eye $l^2$ to the free end of the arm $j$. $n'$ is a cylinder which is fitted inside the chamber $a'$ and forms a continuation of the water-inlet $c$ and in which the valve $l^\times$ is mounted so as to move freely vertically therein. $o$ $o$ are holes with which the said internal tube is provided for enabling water to pass from the cylinder or sleeve $n'$ to the chamber $a'$, and $p$ $p$ are slits for receiving the end of the arm $j$. With this construction of valve when the water enters the inlet-pipe $c$ it raises the valve $l^\times$ off its seat upon the inlet-pipe $c$, through which the water enters the chamber $a'$ and passes out at the outlet $d$. As the valve $l$ rises it rocks the spindle $g'$ and simultaneously raises the gas-valve $m$, so that gas is permitted to enter the inlet $e$ into the chamber $b'$, whence it escapes through the outlet $f$. Should the flow of water be stopped for any reason, the valves automatically drop down under the action of gravity, whereby the valve $m$ cuts off the supply of the gas to the heater, in connection with which the device is fitted. When it is desired to use the chambers in a vertical position, a spring may be added to insure the closing of the valves.

In using the device shown in Figs. 3 and 4 with what is known as a "pressure" water-heater the water-valve may be formed with a plate or disk $l^3$ at its upper extremity, the loop or eye $l^2$, through which the suspending-arm passes, being arranged between the solid block and this plate, as shown in Fig. 5. The action of stopping the flow of water from a pressure-heater causes back pressure to extend through the surface pipes and fittings, which back pressure will in this case act directly upon the plate or disk $l^3$, and thus aid in shutting off the valves.

Having now particularly described and ascertained the nature of our said invention and in what manner the same is to be performed, we declare that what we claim is—

1. In a gas and water regulating valve for water-heaters the combination with a pair of chambers, each provided with separate inlets and outlets, of a rocking spindle having a portion in each of said chambers, stuffing-boxes engaging the portions of said spindle passing through the walls of said chambers, an arm on said spindle within each chamber, a vertically-disposed sleeve in one of said chambers rigidly secured thereto and communicating with the inlet thereof, said sleeve being open at its upper end and provided with discharge-apertures in its walls between its ends, a block movable freely in said sleeve for closing said inlet and discharge apertures, said block being connected with one of said spindle-arms, and a valve in the other chamber connected with the other spindle-arm and adapted to engage the inlet to said chamber, substantially as described.

2. In a gas and water regulating valve for water-heaters the combination with a pair of chambers rigidly connected together, of a spindle having a portion within each of said chambers, stuffing-boxes engaging the portions of said spindle passing through the walls of said chambers, adjustable pivot-pins engaging the ends of said spindle, one of said pins being located in a wall of each chamber, a valve in each chamber, and an arm in each chamber connected to said spindle and to one of said valves, substantially as described.

JOHN WILLIAM EWART.
GEORGE HERBERT EWART.

Witnesses:
C. G. REDFERN,
A. ALBUTT.